Dec. 2, 1958 L. MICHELSON 2,863,139

HIGH SPEED ELECTRONIC SCANNER

Filed April 25, 1952 6 Sheets-Sheet 1

INVENTOR.
L. MICHELSON

BY G. W. O'Brien
R. M. Hicks

ATTYS.

Dec. 2, 1958 L. MICHELSON 2,863,139

HIGH SPEED ELECTRONIC SCANNER

Filed April 25, 1952 6 Sheets-Sheet 2

INVENTOR.
L. MICHELSON
BY
A. W. O'Brien
R. M. Hicks
ATTYS.

Dec. 2, 1958 L. MICHELSON 2,863,139

HIGH SPEED ELECTRONIC SCANNER

Filed April 25, 1952 6 Sheets-Sheet 3

INVENTOR.
L. MICHELSON

BY G. D. O'Brien
R. M. Hicks
ATTYS.

INVENTOR.
L. MICHELSON
BY
G. W. O'Brien
R. M. Hicks
ATTYS.

Dec. 2, 1958 L. MICHELSON 2,863,139

HIGH SPEED ELECTRONIC SCANNER

Filed April 25, 1952 6 Sheets-Sheet 5

*INVENTOR.*
L. MICHELSON

*BY* G. D. O'Brien
R. M. Hicks
*ATTYS*

Dec. 2, 1958 L. MICHELSON 2,863,139

HIGH SPEED ELECTRONIC SCANNER

Filed April 25, 1952 6 Sheets-Sheet 6

INVENTOR.
L. MICHELSON
BY
A. D. O'Brien
R. M. Hicks
ATTYS.

United States Patent Office 2,863,139

Patented Dec. 2, 1958

2,863,139

HIGH SPEED ELECTRONIC SCANNER

Louis Michelson, Middletown, R. I.

Application April 25, 1952, Serial No. 284,460

9 Claims. (Cl. 340—183)

(Granted under Title 35, U. S. Code (1952), sec. 266)

The invention described herein may be manufactured and used by or for the Government of the United States of America for governmental purposes without the payment of any royalties thereon or therefor.

This invention comprises novel and useful improvements in scanning systems, and more particularly pertains to an apparatus for electronically commutating the outputs of a plurality of signal channels in time sequence to a common viewing source.

In the fields of telemetering and automatic control there has arisen a need for an apparatus for rapidly scanning the outputs of various channels, and presenting these outputs continuously and simultaneously. Although various mechanical switches have been developed for switching the output of various channels to a common viewing source, all of these mechanical scanners have, in general, been subject to such faults as: undependability of contact, limited rate of scan, and rapid wear of the mechanical contacting surfaces. In the electronic scanner of the instant invention, the outputs of all channels scanned are presented simultaneously on the face of a cathode ray tube, the presentation being in the form of vertical lines rising above a base line, with each line representing a channel scanned, and the height of the line being proportional to the output voltage level of the associated channel.

The scanner consists of two sections; a sequence pulse producing circuit and a gating circuit, and is used in conjunction with a driving oscillator, and oscilloscope, and a power supply. The oscillator sets the scanning rate by controlling the firing of thyratrons in the pulse producing circuit, and the pulses of each of the thyratrons allow monitoring tubes in the gating circuit to conduct. The plate outputs of these monitoring tubes are applied to the vertical deflection circuits of an oscilloscope and produce the visual presentation set forth in the preceding paragraph.

The pulse producing circuit comprises a plurality of stages, one for each channel to be scanned. Each of the stages, except the first, is arranged to produce a gating pulse only in response to the simultaneous application of a pulse of predetermined polarity produced by the oscillator, and a further pulse produced by the firing of the preceding stage. The oscillator is arranged so that the pulses applied to adjacent stages of the pulse producing circuit are in phase opposition whereby the firing of one stage will not effect the firing of the succeeding stage, until the succeeding half cycle of the oscillator voltage. In this manner the sequential firing of the stages of the pulse producing circuit is achieved, the firing of one stage being instrumental in the firing of the succeeding stage and the oscillator controlling the rate of firing of the successive stages.

The gating circuit also includes a plurality of stages, one for each channel to be scanned, each of which stages of the gating circuit are arranged to pass a signal correlative with the signal produced by the channel monitored thereby, in response to the application of a pulse from the associated stage of the pulse producing circuit. Each of the stages of the gating circuit have a common load impedance, and the voltage appearing thereacross thus comprises a plurality of pulses, in timed spaced relation with each other, each of which pulses is of an amplitude correlative with the amplitude of the voltage from one of the channels. These pulses are applied to the vertical deflection circuits of a cathode ray oscilloscope, to thereby produce a presentation on the screen of the cathode ray tube which is in the form of vertical lines rising above a base line, the height of each of which lines is correlative with the voltage output of one of the channels scanned.

After the completion of a sequential scanning of the various channels, circuitry is provided for extinguishing the stages of the sequence pulse producing circuits and thereby to ready the same for another scanning sequence.

An important object of this invention is to provide a scanning system for electronically commutating a plurality of channels to a common viewing source, in rapid succession, whereby the outputs of the various channels may be simultaneously viewed.

Another object of this invention is to provide a multichannel scanning system in which the signals from a plurality of channels are transformed into rapidly recurrent trains of signal pulses separated by a predetermined time interval, each of which pulses is correlative in amplitude with the amplitude of the signals from different ones of the channels.

A further object of this invention is to provide an electronic scanning system in which the intervals between the scans of the successive signal channels is controlled by a single oscillator.

Another object of this invention is to provide a multichannel scanning system in which the circuitry for effecting scanning of each channel controls the circuitry for effecting scanning of a predetermined succeeding channel, to thereby maintain sequential scanning of the various channels.

Other objects and many of the attendant advantages of this invention will be readily appreciated as the same becomes better understood by reference to the following detailed description when considered in connection with the accompanying drawings wherein.

*Control oscillator*

Figure 1:
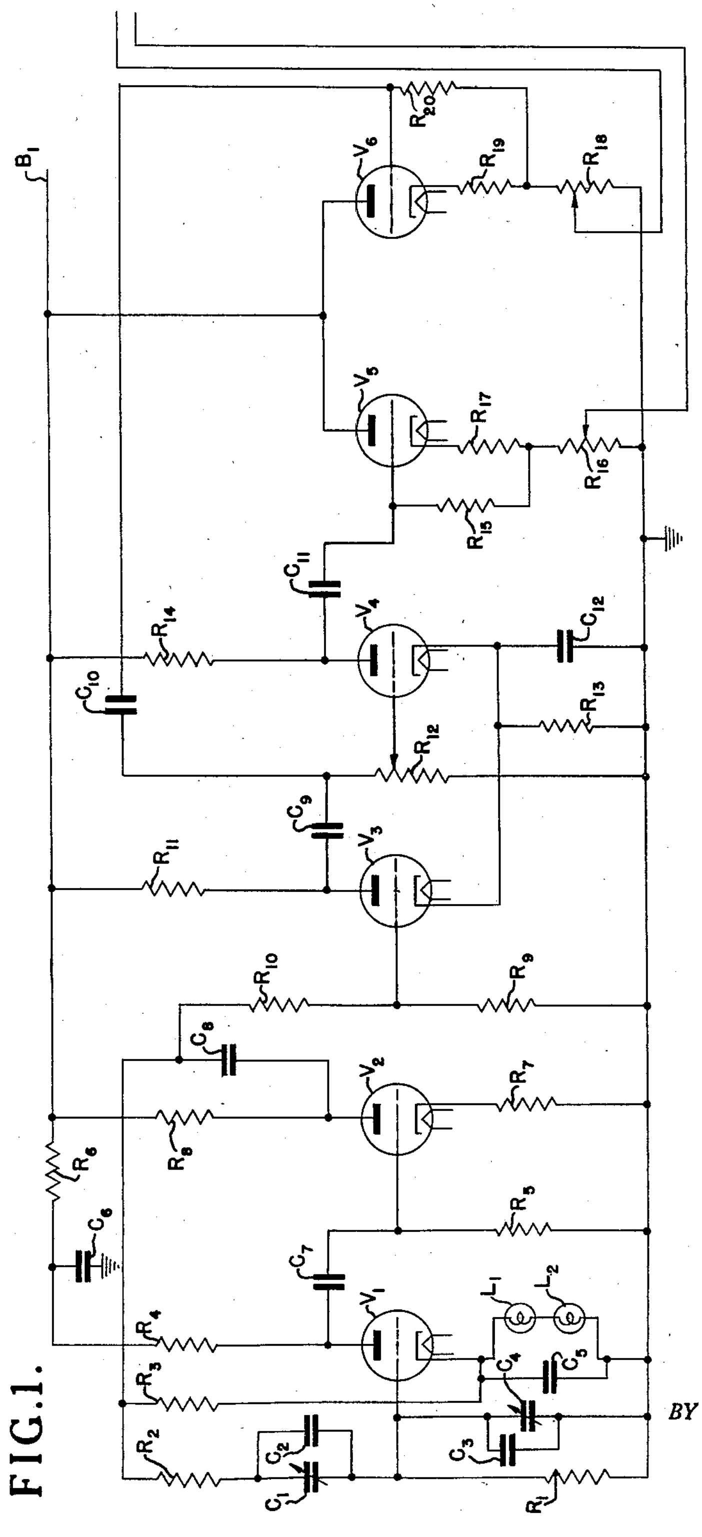
Fig. 1 is a schematic diagram of the control oscillator having a push-pull output stage.

Reference is now made more specifically to Fig. 1 of the drawing wherein there is illustrated an oscillator comprising a multi-vibrator type generator including tubes $V_1$ and $V_2$. Plate potential for the tube $V_2$ is applied from plate supply source $B_1$ through resistor $R_8$, and plate potential for tube $V_1$ is applied by way of resistor $R_6$ and capacitor $C_6$ and resistor $R_4$, from the plate supply source $B_1$. The cathode circuit of tube $V_1$ includes amplitude stabilizing self biasing circuit comprising lamp bulbs $L_1$ and $L_2$, and shunt condenser $C_5$, a portion of the output of tube $V_2$ being applied through condenser $C_8$ and resistor $R_3$ across the aforementioned biasing circuit. The output of tube $V_1$ is applied through coupling condenser $C_7$, across coupling resistor $R_5$, to the grid of tube $V_2$, and as is conventional, the output of tube $V_2$ is applied through condenser $C_8$, resistor $R_2$ and condensers $C_1$ and $C_2$, across grid resistor $R_1$ and shunt condensers $C_3$ and $C_4$ to the grid of tube $V_1$.

A cathode biasing resistor $R_7$ is provided in the cathode circuit of tube $V_2$, the output of the multi-vibrator being applied across resistors $R_9$ and $R_{10}$. The voltage appearing across $R_9$ is applied to the grid of amplifier tube $V_3$, the output of which is applied through capacitor $C_9$ across potentiometer $R_{12}$, the variable tap on the potentiometer being connected to the grid of phase inverter tube $V_4$. The amplifier tube $V_3$ and the inverter tube $V_4$ have a common cathode biasing circuit comprising resistor $R_{13}$ and condenser $C_{12}$, and plate potential for the tubes is applied from source $B_1$ to load resistors $R_{11}$ and $R_{14}$ respectively.

The outputs of tubes $V_3$ and $V_4$ are respectively applied through condensers $C_{10}$ and $C_{11}$ across resistors $R_{18}$, $R_{20}$ and resistors $R_{15}$, $R_{16}$ to the grids of tubes $V_6$ and $V_5$ of the output push-pull amplifier stage. Grid bias for tubes $V_5$ and $V_6$ is provided by cathode biasing resistors $R_{17}$ and $R_{19}$ respectively, and plate potential is applied from source $B_1$ to the plates. The outputs of the push-pull stage, appearing across cathode resistors $R_{16}$ and $R_{18}$ are applied to the hereinafter described sequence pulse producing circuit.

*Sequence pulse producing circuit*

The sequence pulse producing circuit is composed of a plurality of grid controlled thyratron tubes, one of which is provided for each channel, and serves to control an associated monitoring tube in the gating circuit. As each of the stages of the pulse producing circuit and the hereinafter described gating circuit are substantially the same, the same numerals will be used in reference to similar components in the various stages. Additionally, it is to be noted that it is immaterial how many stages are utilized, in the pulse producing circuit, to control an equal number of stages in the gating circuit, it being preferred that an odd number of stages be utilized, for reasons to be hereinafter set forth.

Figure 2:
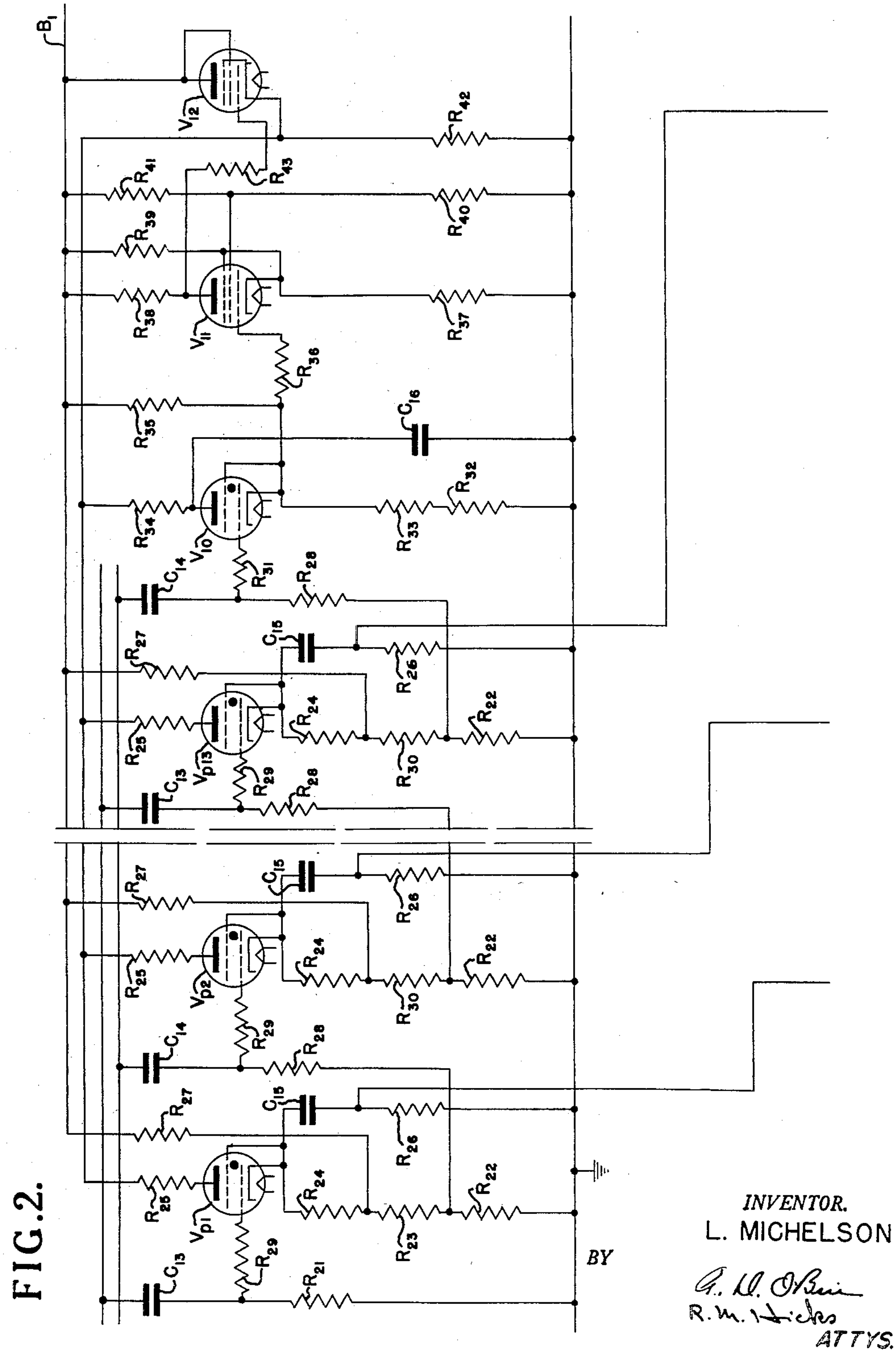
Fig. 2 is a schematic diagram of the sequence pulse producing circuit.

Reference is now made more specifically to Fig. 2 of the drawings wherein there is illustrated a schematic diagram of three stages of a 13 stage sequence pulse producing circuit, it being understood that any even number of stages may be interposed between the second and thirteenth stages illustrated. Each of the grid controlled thyratron tubes $V_{p2}$–$V_{p13}$, which constitute various stages of a 13 stage sequence pulse producing circuit, have resistors $R_{22}$, $R_{24}$ and $R_{30}$ in the cathode circuit thereof, the input stage $V_{p1}$ having series connected resistors $R_{22}$, $R_{23}$ and $R_{24}$ in the cathode circuit, $R_{23}$ being of a relatively lower value than the equivalent resistor $R_{30}$ in the cathode circuits of the other stages of the sequence pulse producing circuit whereby the cathode bias provided from the source $B_1$, through resistors $R_{27}$, will be of a relatively lower value for the input stage than for all subsequent stages, thereby insuring that the sequential firing of these various stages will initiate in the input stage. The cathode bias provided by the aforementioned bleeder system affords a predetermined negative grid-cathode potential for each of the tubes, except the first, and a relatively lower negative grid-cathode potential for the first stage. Additionally, the grids of all tubes, except the first, are connected by way of resistors $R_{29}$ and $R_{28}$ to the cathode of the preceding stage and are maintained thereby at a slight positive potential with respect to ground, by the drop across resistors $R_{22}$. The net grid bias on each tube is therefore a negative potential which is well below the firing potential of the thyratron tubes $V_{p1}$–$V_{p13}$, the negative grid-cathode potential on tube $V_{p1}$ being somewhat less than that on the other stages, for reasons to be hereinafter set forth. When a tube is fired, the increased current through its cathode resistor $R_{22}$ reduces the net bias on the subsequent stage. The grids of alternate tubes are also fed through condensers $C_{13}$ and $C_{14}$ from the oscillator output. One side of the push-pull stage feeds the odd numbered tubes through condensers $C_{13}$, and the other side feeds the even numbered tubes through condensers $C_{14}$, a signal of the same amplitude, but phase shifted by 180°.

The first stage, as hereinbefore mentioned, has a smaller bias than all subsequent stages to insure that the chain of pulses always begins with the same tube, this tube being cathode biased to a negative grid-cathode potential by the bleeder system including resistors $R_{27}$, $R_{23}$ and $R_{22}$, which potential is such that tube $V_{p1}$ will fire in response to a signal of proper polarity from the oscillator, which signal is applied to the grid thereof through condenser $C_{13}$.

*Gating circuits*

Figure 3:
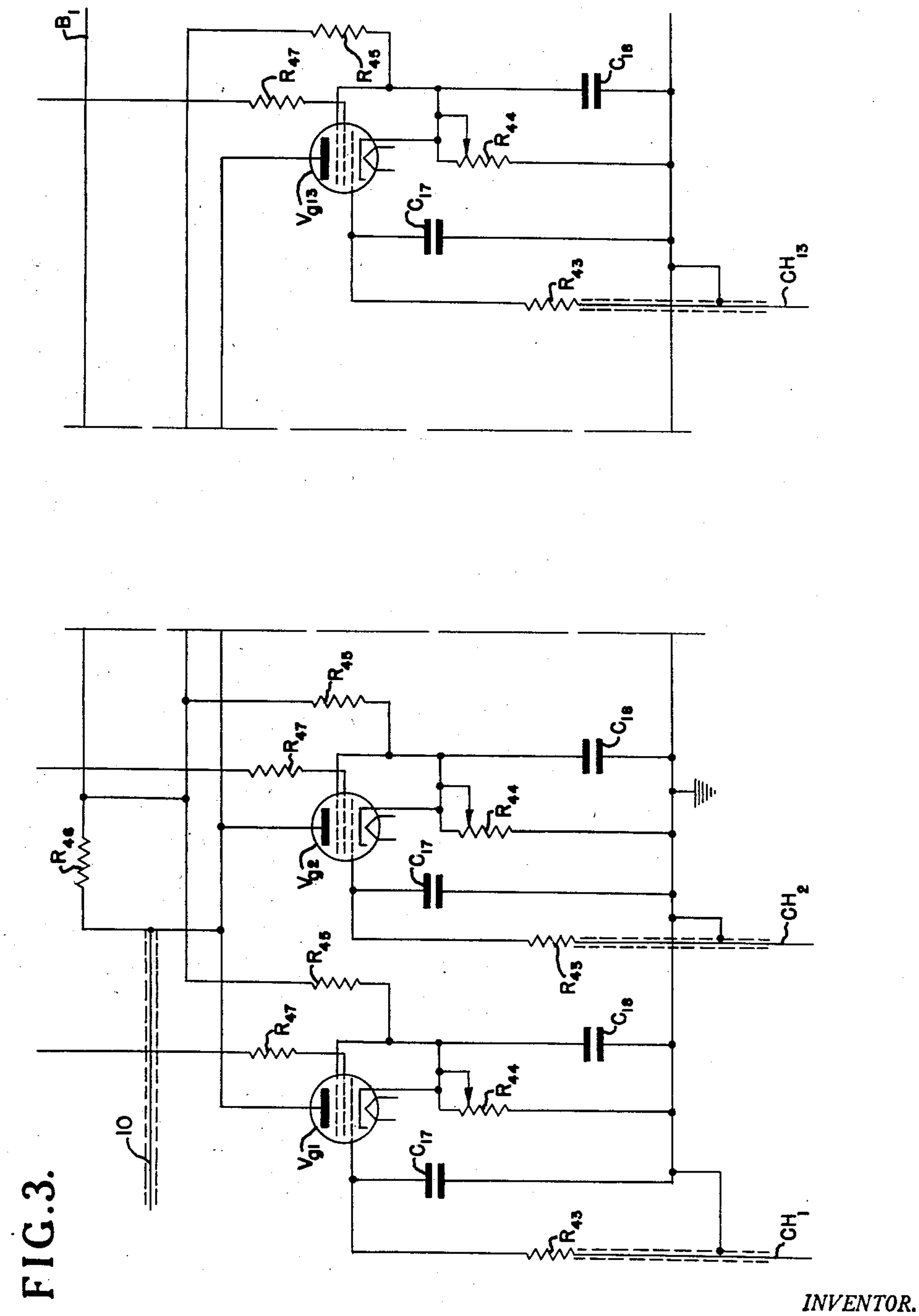
Fig. 3 is a schematic diagram of the gating circuit.

Reference is now made more specifically to Fig. 3 of the drawings wherein various stages of the gating circuit are schematically illustrated, tubes $V_{g1}$, $V_{g2}$ and $V_{g13}$ corresponding to the first, second and thirteenth stages of a 13 stage gating circuit.

The gating circuit utilizes the fact that, if the screen grid of a pentode is held at zero potential, the tube can be cut off even though the plate is at a high potential. When a positive potential of sufficient value is applied to the screen grid, the tube becomes conducting and the plate current will then be a function of the control grid, screen grid and plate voltages. In the gating circuit, one pentode tube is included for each channel to be scanned, the tubes plates all having a common plate load resistor $R_{46}$ which is otherwise connected to the plate supply source $B_1$. The potential across this plate resistor is applied through conductor 10 to the vertical amplifier circuits of any conventional cathode ray oscilloscope. As each of the tubes, in turn, receives a positive pulse on the screen grid thereof, from the sequence pulse producing circuit, the tube conducts plate current, the amplitude of which is proportional to the control grid signal received from the channel it is monitoring, which channels are indicated as $C_{h1}$–$C_{h13}$. The tubes $V_{g1}$–$V_{g13}$ are normally cathode biased by a bleeder system including resistor $R_{45}$ and variable resistor $R_{44}$, which variable resistor is provided so that with any initial control grid voltage, which is to be the threshold value, the tube can be cut off by the cathode bias, even though the screen is driven at a high positive potential. Thus a current output from each of the gating tubes $V_{g1}$–$V_{g13}$ will appear only when the voltage applied to the control grids thereof exceeds this threshold value. As is conventional, the cathode biasing resistors $R_{44}$ are by passed to ground by condensers $C_{18}$ for obvious reasons.

The suppressor grids of each of the tubes $V_{g1}$–$V_{g13}$ are maintained at cathode potential, and the screen grids are connected through resistors $R_{47}$ to the corresponding stages in the sequence pulse producing circuit. Thus, the outputs of tubes $V_{p1}$–$V_{p13}$ are applied through the pulse shaping circuits comprising resistors $R_{26}$ and condensers $C_{15}$ through resistors $R_{47}$ to the screen grids of $V_{g1}$–$V_{g13}$ respectively. The outputs of the various signal channels $C_{h1}$–$C_{h13}$ are applied to the control grids of tubes $V_{g1}$–$V_{g13}$ respectively, through RC circuits each of which includes a resistor $R_{43}$ and a condenser $C_{17}$.

The output of the last tube $V_{p13}$ in the pulse producing circuit, which must be an odd numbered tube, is applied through resistor $R_{28}$ and resistor $R_{31}$ to the control grid of a thyratron tube $V_{10}$, which last mentioned tube is utilized to produce a pulse for extinguishing all of the tubes in the pulse producing circuit. Tube $V_{10}$ is cathode biased by the bleeder system including resistors $R_{32}$, $R_{33}$ and $R_{35}$ to such a potential that the tube will be maintained non-conducting except in response to the application of a predetermined voltage to the control grid thereof produced by the firing of tube $V_{p13}$, and an additional voltage from the oscillator applied through condenser $C_{14}$ to the control grid thereof. In this manner tube $V_{10}$ is caused to fire a predetermined time interval after the firing of tube $V_{p13}$. The output of tube $V_{10}$, appearing across the cathode resistors is applied through resistor $R_{36}$ to the control grid of tube $V_{11}$, which last mentioned tube is normally cut off by cathode bias provided by a bleeder system including cathode resistor $R_{37}$ and resistor $R_{39}$. The plate-cathode path of the current controlling tube $V_{12}$ is connected between the plate supply source $B_1$ and the plate load resistors $R_{25}$ of the tubes $V_{p1}$–$V_{p13}$ of the pulse producing circuits. The plate of $V_{11}$ is connected through resistor $R_{43}$ to the control grid of tube $V_{12}$, and when the former tube is rendered conducting, the plate potential thereof is reduced, thereby biasing tube $V_{12}$ to cut off and increasing the voltage drop across the plate cathode path thereof. Since plate potential for tubes $V_{p1}$–$V_{p13}$ is applied through tube $V_{12}$, and plate load resistors $R_{25}$, plate potential for tube $V_{10}$ being applied through tube $V_{12}$ and plate load resistor $R_{34}$, it is deemed apparent that these tubes will be rendered non-conducting.

Plate potential for tube $V_{11}$ is applied from plate supply source $B_1$ through resistor $R_{38}$, cathode bias being afforded by the bleeder system including resistors $R_{37}$ and $R_{39}$. The screen grid of tube $V_{11}$ is maintained at the proper positive potential by voltage divider system including resistors $R_{40}$ and $R_{41}$. The cathode of $V_{12}$ is connected to ground through resistor $R_{42}$, and condenser $C_{16}$ is provided between the plate of $V_{10}$ and ground in order to insure that the tube $V_{10}$ remains cut-off sufficiently long to prevent the tubes $V_{p1}$–$V_{p13}$ from resumption of firing by raising the plate potential too soon after extinguishing them.

Since the repetition rate of the scanner is limited by the time required for complete deionization of tubes $V_{p1}$–$V_{p13}$, to obtain the highest scanning rates condenser $C_{16}$ must be reduced to the minimum practicable value since the time constant of $R_{34}$ and $C_{16}$, to some extent, limits the scanning rate. To reduce this capacitance, however, it is necessary to increase the bleeder load $R_{42}$ from $V_{12}$ to ground to reduce the plate potential applied to the tubes $V_{p1}$–$V_{p13}$ to a minimum during the recycling time.

From the foregoing description it is thought that the operation of the electronic scanner will be readily understood. When the positive pulse produced by the oscillator reaches the grid of the first pulse tube $V_{p1}$, it reduces the net bias on that tube below the firing potential thereof, and the tube fires. The even numbered tubes such as $V_{p2}$ have an additional negative potential applied to the grids thereof by the oscillator, and consequently do not fire. The odd numbered tubes, however, have the grid bias thereof reduced by a corresponding amount, but, as hereinbefore set forth, this reduction in grid potential by the output of the oscillator is insufficient, of itself, to cause firing of the tubes.

After tube $V_{p1}$ fires, it applies a positive signal to the grid of tube $V_{p2}$ which positive signal is, of itself, also insufficient to cause firing of the tube $V_{p2}$. However, one half cycle later, when the positive half wave of oscillator output voltage is applied to tube $V_{p2}$, the negative bias on the grid thereof is reduced sufficiently to effectuate firing of that tube. In this manner each tube is fired in succession on each successive half cycle of the oscillator.

Figure 4:
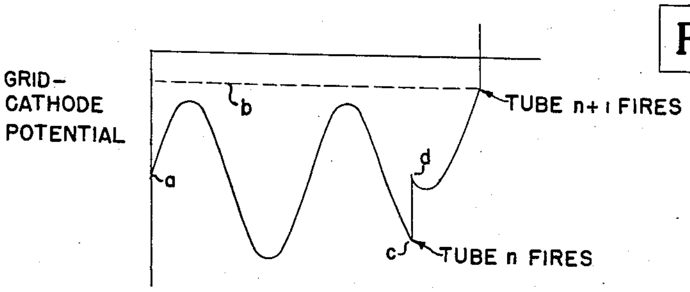
Fig. 4 is a curve showing a net grid-cathode potential of a characteristic tube in the pulse producing circuit.
Figure 9:
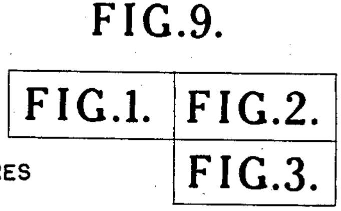
Fig. 9 is a diagram illustrating the arrangement of Figs. 1, 2 and 3 to form a complete circuit diagram.

For a clearer understanding of the variations in grid-cathode potential of each of the tubes, attention is directed to Fig. 4. As is apparent from Fig. 4, the grids of each of the tubes in the pulse producing circuit, except the first, are negatively biased to a predetermined value [indicated at point *a*] by the cathode biasing circuits including resistors $R_{22}$, $R_{30}$ and $R_{27}$. The first tube $V_{p1}$ is cathode biased to a somewhat lower value by biasing circuits including resistors $R_{22}$, $R_{23}$ and $R_{27}$. An alternating voltage is also applied to the grid of each of the tubes from the oscillator, which alternating voltage is insufficient, of itself, to reduce the net grid-cathode bias of any of the tubes $V_{p2}$–$V_{p13}$ below the firing potential of the tubes [indicated by the line *b*], but which oscillator voltage is sufficient to initiate firing of $V_{p1}$. When any tube $n$ fires, as indicated at point *c*, a positive pulse produced across the resistor $R_{22}$ of that tube is applied through resistors $R_{28}$ and $R_{29}$ to the grid of the succeeding tube $n+1$. This pulse decreases the net bias on tube $n+1$ by an amount indicated by line *cd*, whereby on the succeeding positive half cycle of the A.-C. voltage from the oscillator, the net grid-cathode potential of tube $n+1$ is raised above the firing potential, and tube $n+1$ fires.

Figure 5:
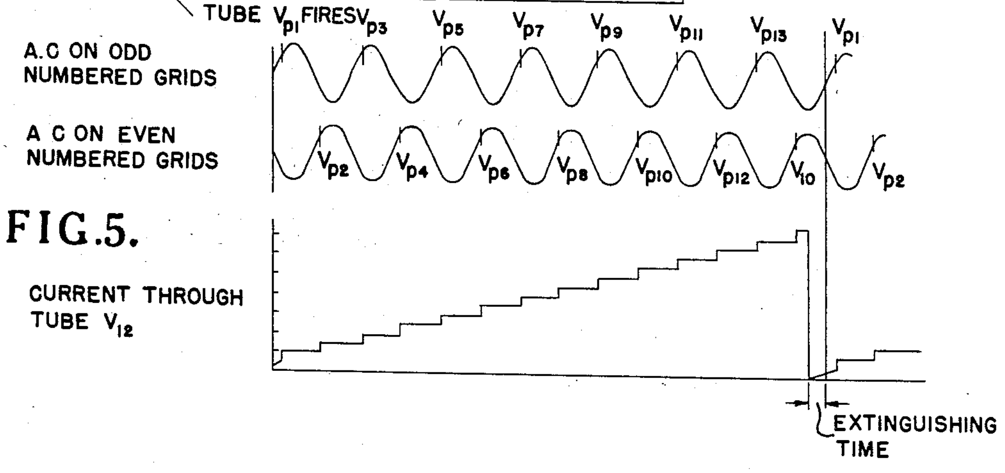
Fig. 5 is a series of curves showing the time relation between the alternating current control signal from the oscillator and plate current drawn by the pulse producing circuits of a thirteen-channel high speed electronic scanner.

Fig. 5 illustrates the relation between the oscillator voltage on the odd and even numbered grids of the thyratron tubes in the pulse producing circuit and the time intervals at which the various tubes sequentially fire. Additionally, Fig. 5 illustrates the variations in current through tube $V_{12}$ in response to the sequential firing of tubes $V_{p1}$–$V_{p13}$. As is apparent, each of the tubes $V_{p1}$–$V_{p13}$ remain conducting, after being fired, until tube $V_{10}$ is fired which tube, as hereinbefore set forth renders tube $V_{11}$ conducting thereby cutting off current flow through tube $V_{12}$. Tube $V_{10}$ is maintained conducting for a time interval after tube $V_{12}$ is cut off, the time interval being determined by the discharge time of condenser $C_{16}$. After condenser $C_{16}$ becomes sufficiently discharged, tube $V_{10}$ no longer conducts and plate potential is again applied through tube $V_{12}$ to the plates of tube $V_{p1}$–$V_{p13}$. Tube $V_{p1}$ will then be rendered conducting on the succeeding positive half cycle of the oscillator output voltage applied to the grid thereof.

Figure 6A:
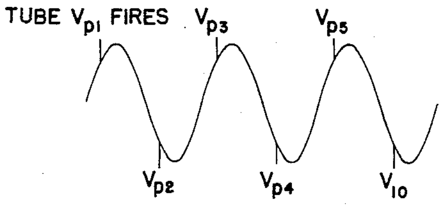
Fig. 6A, 6B and 6C are a series of curves showing the time relations between the oscillator output voltage; the plate current for the various stages of a 5 channel pulse producing circuit and the output voltage pulses from the pulse producing circuit.
Figure 6B:
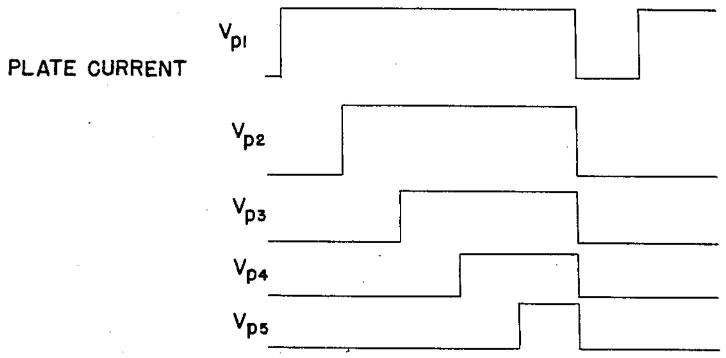
Figure 6C:
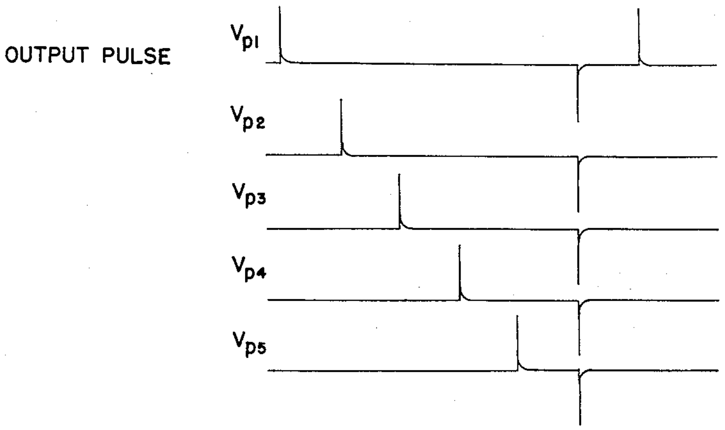

Curve 6A illustrates the relative firing times of tubes $V_{p1}$–$V_{p5}$ of a five channel pulse producer, in response to the application of an alternating current voltage from the oscillator to the control grids thereof, in the manner hereinbefore set forth, the tube $V_{10}$ being fired on the succeeding half cycle of oscillator output voltage after the firing of the last tube of the sequence pulse producing circuit, which for a five channel pulse producer is tube $V_{p5}$. Fig. 6B is a group of curves illustrating the variations in plate current for tubes $V_{p1}$–$V_{p5}$, in response to the sequential firing of those tubes; and Fig. 6C is a group of curves illustrating the output pulse forms appearing across resistors $R_{26}$, and applied to the grids of the gating tube sections $V_{g1}$–$V_{g5}$, the positive pulses being formed when the pulse circuit tubes are rendered conducting, and the negative pulses being formed when the pulse circuit tubes are extinguished.

Figure 7:
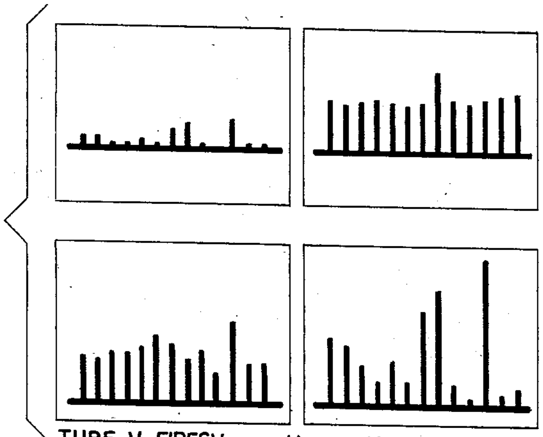
Fig. 7 illustrates a series of oscilloscope patterns produced by a 13 channel scanner.

Fig. 7 illustrates a series of oscilloscope patterns produced by a thirteen channel high speed scanner.

Figure 8:
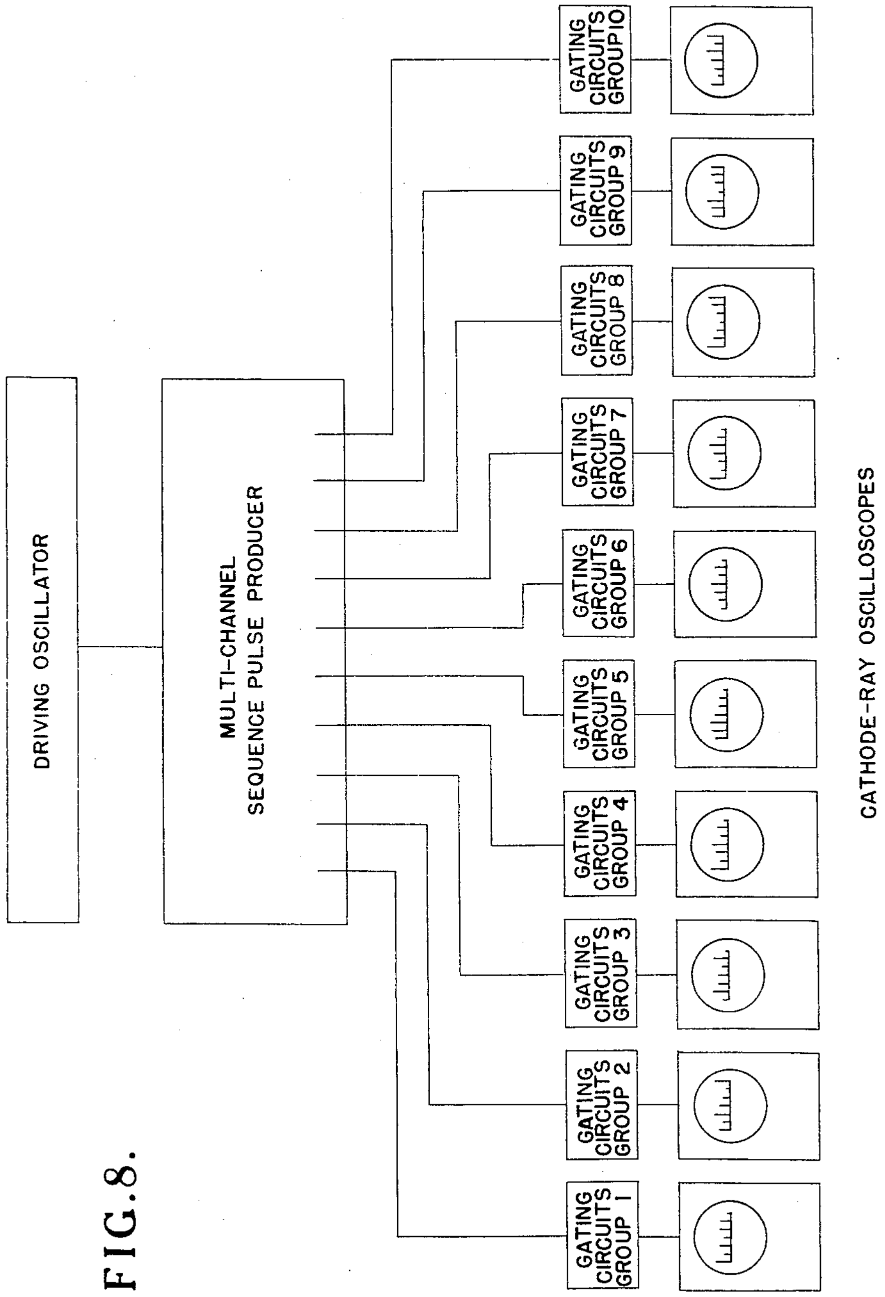
Fig. 8 is a block diagram of a high speed electronic scanning system for ten groups of thirteen-channels.

The sequence pulse producing circuit is capable of controlling more than one set of gating sections. Thus, a single driving oscillator, and sequence pulse producing circuit may be utilized to control a plurality of groups of gating sections, as is illustrated in Fig. 8, each of which gating sections monitor a plurality of channels, as hereinbefore set forth.

The rate at which the tubes $V_{p1}$–$V_{p13}$ in the sequence pulse producing circuit sequentially fire is thus controlled by the oscillator frequency. Obviously, any oscillator which will provide oppositely phased A.-C. signals on the grids of adjacent stages in the pulse producing circuit, may be employed.

Obviously many modifications and variations of the present invention are possible in the light of the above teachings. It is therefore, to be understood that within the scope of the appended claims the invention may be practiced otherwise than as specifically described.

What is claimed as new and desired to be secured by Letters Patent of the United States is:

1. An apparatus for scanning a plurality of signal producing channels comprising a plurality of gating stages each individual to one of said channels and responsive to a gating pulse for producing an output voltage pulse correlative in amplitude with the signal produced by the channel monitored thereby, a sequence pulse producing circuit comprising a series of grid controlled gaseous discharge devices connected in cascade and each adapted to be fired in response to a voltage of predetermined amplitude and polarity applied to the control grid thereof, means responsive to the firing of each of said discharge devices for applying a first voltage to the control grid of the succeeding discharge device having an amplitude less than said predetermined amplitude, means for applying opposedly phased A.-C. voltages having peak amplitudes less than said predetermined amplitude to the control grids of series adjacent discharge devices to effect sequential firing of said series of discharge devices in accordance with the frequency of said A.-C. voltages, and means responsive to the firing of each of said discharge devices for applying a gating pulse to different ones of said gating stages.

2. The combination of claim 1 wherein said last mentioned means includes an R-C pulse forming circuit.

3. A rapid sequence pulse producing circuit comprising a plurality of grid controlled gaseous discharge devices, means connecting said discharge devices in cascade to thereby apply a positive voltage produced by firing of one device to the control grids of the subsequent discharge device, means including an oscillator for applying opposedly phased A.-C. voltages to the control grids of series adjacent discharge devices, means including said oscillator for initiating conduction in the first of said cascaded discharge devices, the other of said discharge devices being adapted to fire only in response to the simultaneous application of a positive voltage from said oscillator and a further positive voltage produced by the firing of the preceding discharge device R-C network means individually coupled to each of said gaseous discharge devices for producing an output pulse in response to the firing of the coupled discharge device, means including a normally conducting grid controlled tube for applying plate potential to said discharge devices, and means responsive to the firing of the final one of said devices and a positive voltage from said oscillator for rendering said tube non-conducting to thereby reduce the plate potential on said discharge devices and render the latter non-conducting.

4. Apparatus for scanning a plurality of amplitude modulated signal producing channels comprising controlling circuit means for providing a pair of alternating current control signals of a preselected amplitude and frequency, said signals having an opposite instantaneous polarity, a pair of transmission means for individually transmitting one of said pair of control signals, a plurality of impulse actuated amplifier circuit means each individually coupled to one of the signal producing channels for translating an output signal having an amplitude correlative to the amplitude modulated signal on the respective channel, a plurality of cascade coupled circuit means each including a grid controlled gas discharge device adapted to be fired upon the application of a predetermined amplitude positive signal to the control grid thereof, said predetermined amplitude signal being greater than said preselected amplitude of said control signals for all but the first one of said devices, said first device being fired in response to a positive polarity control signal of said preselected amplitude, circuit means for coupling alternate ones of said pair of transmission means to the control grids of alternate ones of said devices and thereby effecting firing of said first device in response to a positive polarity control signal on the respective transmission means coupled thereto, circuit means responsive to the firing of a preceding device for applying to the control grid of a succeeding device a positive signal which conjointly with a positive control signal on the transmission means coupled to the respective succeeding device is equivalent to said predetermined amplitude signal, thereby resulting in sequential firing of the devices in said cascade coupled circuit means, a plurality of impulse generating circuit means each individually intercoupling respective ones of said cascade coupled circuit means and respective ones of said amplifier circuit means for effecting sequential actuation of each of said amplifier circuit means at a rate correlative to the frequency of said control signals, and means for simultaneously displaying each of said translated output signals.

5. Apparatus according to claim 4 wherein said controlling circuit means includes a multivibrator for generating control impulses at a preselected frequency, circuit means for stabilizing the amplitude of said generated control impulses, paraphase circuit means for converting said control impulses into a pair of opposite phased control impulse signals, and push-pull amplifier circuit means for converting said pair of opposite phased control impulse signals into a pair of alternating current control signals of opposite instantaneous polarity.

6. Apparatus according to claim 4 wherein said plurality of impulse actuated amplifier circuit means have a common output impedance across which the translated output signal from each one thereof is developed.

7. Apparatus according to claim 4 wherein each of said plurality of impulse generating circuit means comprises an R-C integrating network.

8. Apparatus according to claim 4 wherein said last recited means comprises a cathode ray oscilloscope.

9. Apparatus according to claim 4 and including circuit means responsive to the firing of the last one of said gas discharge devices in said cascade coupled circuit means for simultaneously extinguishing each of said gas discharge devices.

References Cited in the file of this patent

UNITED STATES PATENTS

| | | |
|---|---|---|
| 2,379,093 | Massonneau | June 26, 1945 |
| 2,444,950 | Nichols | July 13, 1948 |
| 2,487,778 | Atlas | Nov. 15, 1949 |
| 2,489,253 | Andre | Nov. 29, 1949 |
| 2,508,538 | Posthumus | May 23, 1950 |
| 2,521,353 | Fitch et al. | Sept. 5, 1950 |
| 2,556,614 | Desch et al. | June 12, 1951 |
| 2,586,151 | Costello | Feb. 19, 1952 |
| 2,595,045 | Desch et al. | Apr. 29, 1952 |
| 2,622,153 | Schuler | Dec. 16, 1952 |